United States Patent [19]
Hall

[11] Patent Number: 5,265,469
[45] Date of Patent: Nov. 30, 1993

[54] WIND DETECTING AND ALERTING APPARATUS

[76] Inventor: David R. Hall, 10000-B Rutland Village E., Austin, Tex. 78758

[21] Appl. No.: 848,735

[22] Filed: Mar. 10, 1992

[51] Int. Cl.$^5$ ............................................. G01W 1/00
[52] U.S. Cl. ................................ 73/170.15; 73/170.09
[58] Field of Search ............ 73/189, 188, 170, 861.71, 73/861.85, 170.05, 170.07, 170.08, 170.09, 170.15; 116/112, 270, 275, 265; 340/601

[56] References Cited

U.S. PATENT DOCUMENTS

| | | | |
|---|---|---|---|
| 2,812,512 | 11/1957 | Budde | 340/601 |
| 2,913,546 | 11/1959 | Guinn | 340/601 |
| 3,162,847 | 12/1964 | Huffman | 116/112 |
| 3,343,412 | 9/1967 | Stout, Jr. | 73/189 |
| 3,964,038 | 6/1976 | Rutherford | 73/189 |
| 4,031,754 | 6/1977 | Bedard | 340/601 |
| 4,658,645 | 4/1987 | Petesen, Jr. | 73/189 |

FOREIGN PATENT DOCUMENTS 959297 5/1964 United Kingdom ................ 340/601

Primary Examiner—Herbert Goldstein
Assistant Examiner—R. Biegel
Attorney, Agent, or Firm—John R. Flanagan

[57] ABSTRACT

A wind detecting and alerting apparatus includes a wind-sensing member, a support member, and an annular member, all of which are electrically-conductive. The apparatus also includes a support platform, and an electrical alarm circuit. The wind-sensing member has an elongated arm, a wind vane mounted on the arm and capable of sensing wind direction, and a wind deflector mounted on the arm and capable of sensing wind velocity. The support member mounts the elongated arm of the wind-sensing member to undergo rotational movement in response to the sensing of wind direction by the wind vane and pivotal movement in response to the sensing of wind velocity by the wind deflector. The support platform mounts the support member in an upright orientation and mounts the annular member concentrically about and spaced outwardly from the upright support member and below the rotational path of the wind-sensing member. The electrical alarm circuit is electrically connected between the upright support member and the annular member and is normally in an open switch condition. The circuit is capable of changing to a closed switch condition upon pivotal movement of the wind-sensing member through a sufficient displacement to make electrical contact with the annular member in response to sensing of wind velocity above a preset magnitude.

21 Claims, 2 Drawing Sheets

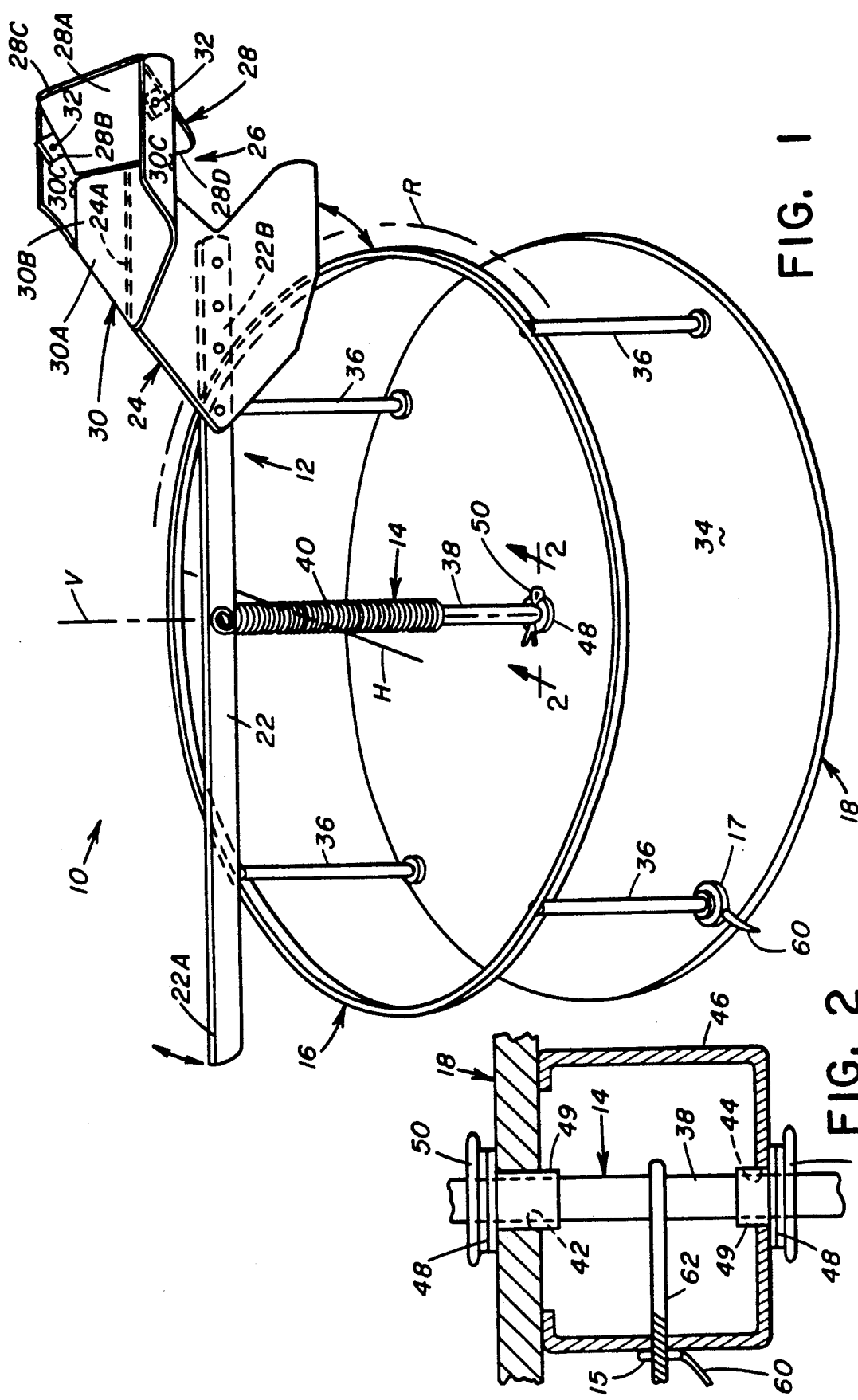

WIND DETECTING AND ALERTING APPARATUS

BACKGROUND OF THE INVENTION

1. Field of the Invention

The present invention generally relates to techniques for detecting the onset of severe wind and, more particularly, is concerned with a wind detecting and alerting apparatus.

2. Description of the Prior Art

Communities across the United States rely on the National Weather Service for advance warning of the approach of severe and dangerous weather carrying high winds, such as thunderstorms and tornados. The warning typically covers a large region and is broadcast by radio and television stations whose signals are received in the region. Also, some communities have sirens which are sounded to convey the warning.

However, oftentimes the warning arrives after the damaging high winds have already passed through some local communities in the region and caused considerable damage to property and injury or death of individuals. There is no guarantee in any localized community that the warning will arrive soon enough to permit people to take appropriate precautions and protective shelter.

Attempts have been made in the prior patent art to design devices to detect when the wind velocity exceeds a particular value. One such wind detection device is disclosed in U.S. Pat. No. 4,034,174 to McCord. The wind detection device of the McCord patent employs a hollow standpipe mounted upright on a support structure, such as a roof, by a bracket, and a hollow wind tube rotatably secured by a bolt and bushing to an upper end of the standpipe. Within the wind tube is a flared metal disc attached to a leaf spring switch actuator which, in turn, is part of a switch on a housing. The housing is mounted by a bracket near to a forward open end of the wind tube, while a wind vane responsive to wind direction is mounted by a bracket to a rear open end of the wind tube.

The wind detection device of the McCord patent also includes an electrical circuit containing an alarm and battery connected in series with one another and with the spring switch actuator on the switch housing. An electrical wire of the circuit is routed from the switch housing down along the exterior of the standpipe to the bracket mounting the standpipe and therefrom through the roof to the location where the wire is connected to the alarm and battery. A stop bracket is attached to the wind tube adjacent its pivotal axis and a stop pin is mounted on the standpipe. The stop bracket and pin cooperate to limit the wind tube to a single revolution about its axis in order to avoid entanglement or wrapping of the electrical wire about the standpipe. One or more slip rings may be used in the electrical circuit instead of the external wire in order to obviate the need for the stop bracket and pin.

In operation, wind blowing on the wind vane of the wind tube of the wind detection device causes the wind tube to rotate and point in the wind's direction. The disc on the spring switch actuator will thus face the wind directly, regardless of the wind's direction. The force of the wind acts on the disc tending to move it, with the configuration of the spring switch actuator providing the force resisting such movement. By changing either the size of the disc or by bending the spring switch actuator, the wind velocity need to move the disc and thus to actuate the switch within the housing can be varied.

While the McCord wind detection device may be a step in the right direction, it does not nearly approach an optimum design for devices of this nature. The abovedescribed construction of the McCord device appears to have several drawbacks which will adversely affect its reliability over time and will require periodic service check-ups and maintenance.

One drawback is that the open-ended hollow wind tube will not only receive the blowing wind but also debris and foreign matter carried by the wind. Birds might also find the open-ended hollow wind tube to be an attractive site for building a nest. In any event, it is likely that debris will tend to accumulate within the tube and on the disc and spring switch actuator and eventually adversely affect the operation of the switch. As a result, the ability of the switch to respond to wind velocity exceeding a particular value cannot be assured at any given time.

Another drawback is that the relative moving components of the device are exposed to the adverse elements of the environment which means that they will require frequent lubrication and maintenance to ensure that they are in operative working condition. This will require that frequent trips be made to the top of the roof to service the device.

In view of these shortcomings of the McCord device, a need still remains for more improvements in techniques for detecting the onset of severe wind.

SUMMARY OF THE INVENTION

The present invention provides a wind detecting and alerting apparatus designed to overcome existing problems and satisfy the aforementioned need. The apparatus of the present invention is capable of detecting wind above a preset threshold and, in response thereto, of alerting people, including handicapped, deaf and blind persons, of a potentially dangerous and life-threatening high wind condition in advance of the actual onset thereof. The apparatus is substantially maintenance-free and weatherproof so that effective operation is ensured without the necessity of making frequent trips to the mounting location to check the apparatus. The apparatus employs conventional readily-available materials in its construction and conventional techniques in its manufacture.

Accordingly, the present invention is directed to a wind detecting and alerting apparatus which comprises: (a) an electrically-conductive wind-sensing member having first means for sensing wind direction and second means for sensing wind velocity; (b) an electrically-conductive support member electrically connected to and mounting the wind-sensing member for concurrently undergoing rotational movement about a first axis in response to sensing wind direction by the first means and pivotal movement about a second axis in response to sensing wind velocity by the second means, the second means being capable of causing increasing pivotal movement of the wind-sensing member about the second axis as the wind velocity sensed by the second means increases in magnitude; (c) an electrically conductive annular member mounted concentrically about the first axis and in alignment with a rotational path of the first means of the wind-sensing member about the first axis, the annular member and wind-sensing member together forming an electrical switch, the wind-sensing member being normally spaced from the annular member to define an open switch condition therewith in response to wind velocity sensed by the second means being below a preset magnitude, the wind-sensing member capable of making electrical contact with the annular member to define a closed switch condition therewith in response to wind velocity sensed by the second means increasing above the preset magnitude; and (d) means electrically connected between the support member and annular member and being electrically connectable to a source of electrical power for producing an alarm in response to the electrical contact being made between the wind-sensing member and annular member and thereby providing an indication that wind velocity has increased above the preset magnitude.

More particularly, the wind-sensing member includes an elongated arm, a wind vane attached on a rear end of the elongated arm and being capable of sensing wind direction, and a wind deflector attached on an upper portion of the wind vane and being capable of sensing wind velocity. The wind deflector includes a main mounting portion attached on the wind vane and a rear deflecting portion pivotally mounted to the main mounting portion and being adjustable to a desired inclination relative to the main mounting portion and thereby to preset the velocity of the wind that will be able to deflect the wind-sensing member into electrical contact with the annular member.

The wind detecting and alerting apparatus further comprises a support platform. The support platform mounts the support member in an upright orientation at substantially the center of the platform and mounts the annular member concentrically about and spaced outwardly from the upright support member and below the rotational path of the wind-sensing member. The upright support member includes a lower shaft rotatably mounted to the platform and an upper resiliently flexible elongated spring mounted to the lower shaft and mounting the elongated arm of the wind-sensing member for pivotal movement relative to the platform and annular member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top perspective view of a wind detecting and alerting apparatus of the present invention.

FIG. 2 is an enlarged fragmentary sectional view of the apparatus taken along line 2—2 of FIG. 1.

DETAILED DESCRIPTION OF THE INVENTION

Figure 3:
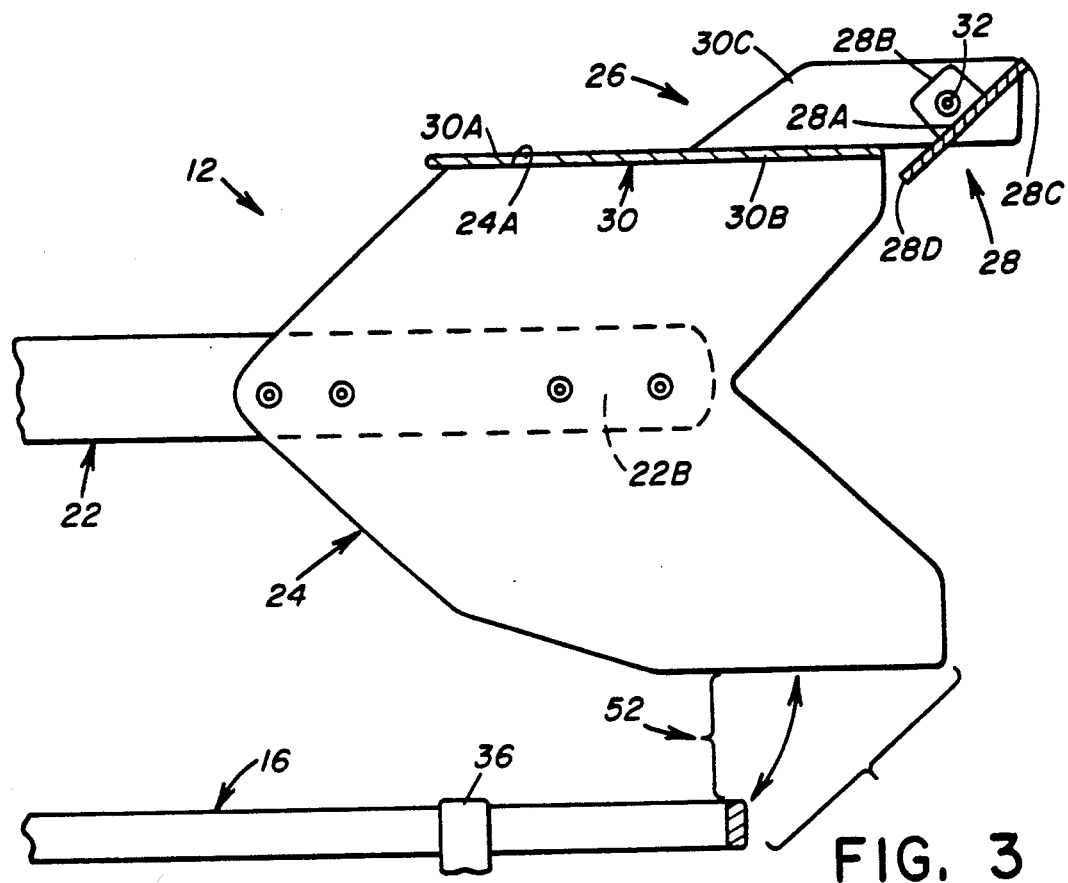
FIG. 3 is an enlarged fragmentary side elevational view of a wind-sensing member of the apparatus of FIG. 1.

Referring to the drawings and particularly to FIG. 1, there is illustrated a wind detecting and alerting apparatus, generally designated 10, of the present invention. The apparatus 10 is operable to detect wind and to alert people, in real-time, in advance of the actual onset of a dangerous and potentially life-threatening wind condition.

Figure 4:
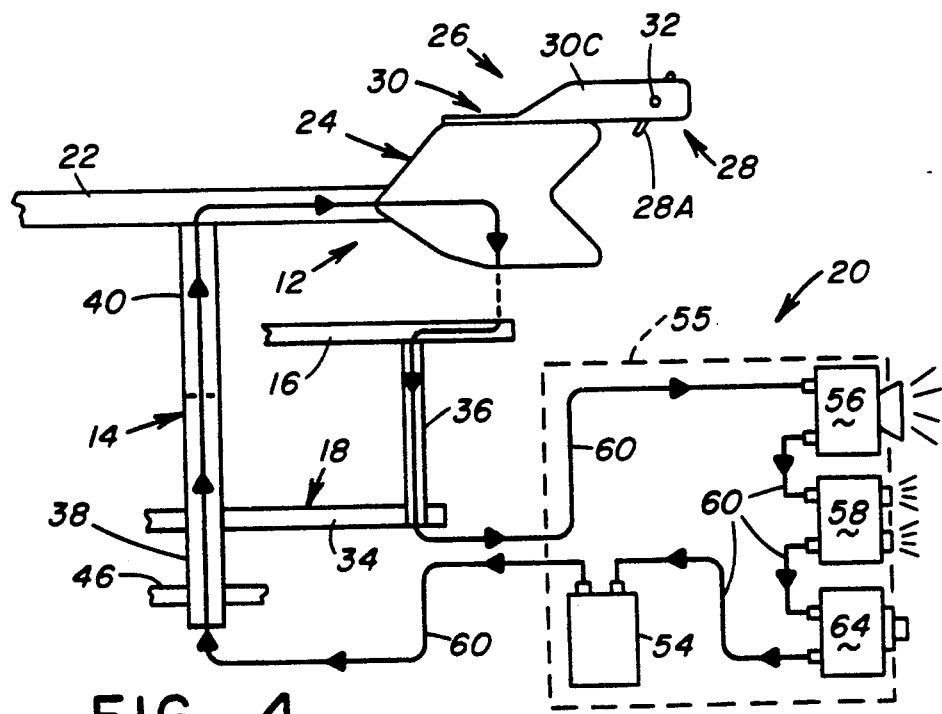
FIG. 4 is a diagrammatic view of an electrical alarm circuit of the apparatus.

Basically, the wind detecting and alerting apparatus 10 includes an electrically-conductive wind-sensing member 12, an electrically-conductive support member 14, an electrically-conductive annular member 16, a support platform 18, and an electrical alarm circuit 20 (see FIG. 4). The wind-sensing member 12 has an elongated arm 22, a wind vane 24 mounted on the arm 22 and capable of sensing wind velocity, and a wind "spoiler" or deflector 26 mounted on the arm 22 and capable of sensing wind velocity.

The support member 14 mounts the elongated arm 22 of the wind-sensing member 12 to undergo rotational movement in response to the sensing of wind direction by the wind vane 24 and pivotal movement in response to the sensing of wind velocity by the wind deflector 26. The support platform 18 mounts the support member 14 in an upright orientation and mounts the annular member 16 concentrically about and spaced outwardly from the upright support member 14 and below a rotational path R of the wind-sensing member 12. The electrical alarm circuit 20 of FIG. 4 is electrically connected between the upright support member 14 and the annular member 16 by respective annular connectors 15 and 17 shown in FIGS. 1 and 2. The electrical alarm circuit 20 is normally in an open switch condition, but is capable of changing to a closed switch condition upon pivotal movement of the wind-sensing member 12 through a sufficient displacement to make electrical contact with the annular member 16 in response to sensing of wind velocity above a preset magnitude.

Referring to FIGS. 1-4, the elongated arm 22 of the wind-sensing member 12 has a generally pointed forward end 22A and the wind vane 24 mounted on a rear end 22B thereof. The wind vane 24 of the elongated member 12 is preferably in the form of a thin V-shaped plate rigidly attached along its centerline in a generally vertical orientation to the rear end 22B of the elongated arm 22. The elongated arm 22 and wind vane 24 can be composed of any suitable electrically-conductive metallic material.

The wind deflector 26 of wind-sensing member 12 includes an adjustable rear deflecting portion 28 and a main mounting portion 30. The main mounting portion 30 has an overall planar configuration with a forward triangular section 30A and a rearward rectangular section 30B. The main mounting portion 30 of the wind deflector 26 is rigidly attached along its centerline in a generally horizontal orientation to an upper edge 24A of the vertically-oriented wind vane plate 24. The main mounting portion 30 also has a pair of side flanges 30C extending in a generally vertical orientation and thus perpendicular to and attached along the opposite side edges of the rearward rectangular section 30B of the main mounting portion 30 and also have rear ends projecting rearward therefrom.

The adjustable rear deflecting portion 28 of the wind deflector 26 is pivotally supported between the rear ends of the side flanges 30C of the main mounting portion 30 of the wind deflector 26. The rear deflecting portion 28 includes a planar panel section 28A of generally rectangular shape and a pair of side tabs 28B extending generally perpendicularly to and attached along opposite side edges of the panel section 28A closer to opposite ends of a transverse rear edge 28C of the rear deflecting portion 28 than to a transverse front edge 28D thereof. The side tabs 28B of the rear deflecting portion 28 are pivotally connected to the rear ends of the side flanges 30C of the main mounting portion 30 by pivot elements 32. The transverse rear edge 28C of the rear deflecting portion 28 is disposed above the plane of the main mounting portion 30 of the wind deflector 26, whereas the transverse front edge 28D of the rear deflecting portion 28 is disposed below the plane of the main mounting portion 30 thereof.

The angle of inclination of the adjustable rear deflecting portion 28 of the wind deflector 26 relative to the main mounting portion 30 thereof can be selectively increased or decreased, such as between 20° to 45°, by manually pivoting the rear deflecting portion 28 to a desired inclination relative to the main mounting portion 30 to thereby preset the velocity of the wind that will be able to deflect the wind-sensing member 12 into electrical contact with the annular member 16. Frictional contact of the side tabs 28B of the rear deflecting portion 28 with the side flanges 30C of the main mounting portion 30 will maintain the rear deflecting portion 28 at the desired adjusted inclined position.

Referring to FIGS. 1 and 2, the platform of the apparatus 10 includes a generally circular base 34 composed of any suitable electrically non-conductive material, such as plywood or a suitable plastic material, and a plurality of support posts 36 attached in upstanding relation on the base 34 and spaced from one another about the periphery thereof. The support posts 36 preferably are composed of any suitable electrically-conductive metallic material, such as zinc. The annular member 16, preferably in the form of a band or ring, is attached to the upper ends of the support posts 36. The annular member 16 can be composed of any suitable electrically conductive metallic material, such as steel or copper.

The upright support member 14 of the apparatus 10 includes a lower shaft 38 and upper resiliently flexible coil spring 40 composed of any suitable electrically conductive metallic materials. The lower shaft 38 extends through an opening 42 in the center of the platform base 34 and through another opening 44 aligned therewith which is defined in a support bracket 46 attached to an underside of the base 34. The lower shaft 38 is rotatably mounted to the platform base 34 and bracket 46 between a pair of vertically spaced washers 48 and nylon bushings 49 inserted on the shaft 38 and retained above the base 34 and below the bracket 46 by a pair of pins 50 inserted transversely through the shaft 38.

The upper flexible spring 40 at its lower end frictionally fits in overlapping relation over an upper end of the lower shaft 38 and at its upper end is fixedly attached to a generally middle location of the elongated arm 22 of the wind-sensing member 12. The rotatably mounted lower shaft 38 and resiliently flexible upper spring 40 cooperate together to permit the wind-sensing member 12 to concurrently undergo rotational movement relative to the stationary platform 18 and annular member 16 (through more than 360°) about a generally vertical axis V defined by the lower shaft 38 in response to the sensing of wind direction by the wind vane 24 and pivotal movement relative to the stationary platform 18 and annular member 16 about a horizontal axis H defined by the upper flexible spring 40 in response to the sensing of wind velocity by the the wind deflector 26. The inclined deflecting portion 28 of the wind deflector 26 causes increasing pivotal movement of the wind-sensing member 12 about the horizontal axis H as the wind velocity sensed by the deflector 26 increases in magnitude.

The annular member 16 is stationarily mounted by the support posts 36 of the platform 18 in concentric relation about the vertical axis V defined by the lower shaft 38 of the upright support member 14. The annular member 16 is also disposed by the posts 36 in alignment below a rotational path R of the wind vane 24 of the windsensing member 12 about the vertical axis V. As the wind velocity increases in magnitude, eventually the windsensing member 12 will pivot relative to the stationary angular member 16 through a sufficient displacement about the horizontal axis H to bring the wind vane 24 into physical and electrical contact with the annular member 16. By manually rotating and axially sliding the upper spring 40 relative to the lower shaft 38 to change the amount by which the lower end of the upper spring 40 overlaps with the upper end of the lower shaft 38, the height of a gap 52 between the annular member 16 and lower edge of the wind vane 24 can be selectively increased or decreased in order to preset the magnitude of wind velocity required to deflect the wind-sensing member 12 into contact with the annular member 16. As an example, when the gap 52 is about one-half inch in height, it will take a wind velocity of from sixty to sixty-five miles per hour to deflect the wind-sensing member 12 into contact with the annular member 16. The gap height can be set for detecting any wind velocity with the range of from about fifty to one-hundred miles per hour.

Referring to FIG. 4, there is diagrammatically illustrated the electrical alarm circuit 20 of the apparatus 10. The circuit 20 includes a source 54 of electrical power, such as a nine volt d.c. battery, and a housing 55 containing an audible alarm 56, such as a two-tone 100 dB piezo buzzer, and a visible alarm 58, such as a pair of red lights, all of which are electrically connected together in series by conductors 60. The conductors 60 are also connected to the annular member 16 via one of the support posts 36 and to the wind-sensing member 12 via a conductive finger 62 (see FIG. 2) mounted to the support bracket 46 and contacting the upright support member 14 which, in turn, is connected to the elongated arm 22 of the wind-sensing member 12. The electrical alarm circuit 20 and other parts of the apparatus 10 define a circuit path depicted by the arrowheads on conductors 60 and on a line running through such other parts of the apparatus 10, namely, the support member 14, elongated arm 22, wind vane 24, annular member 16 and the one support post 36. The audible alarm 56 and visible alarm 58 produce alarm signals in response to electrical contact to close the circuit path being made between the wind-sensing member 12 and annular member 16 and thereby provide an indication that wind velocity has increased above the preset magnitude. A test button 64 is also provided on the housing 55 for testing the strength of the battery 54.

The annular member 16 and the wind vane 24 of the wind-sensing member 12 together define components of an electrical switch of the electrical alarm circuit 20. The wind vane 24 of the wind-sensing member 12 is normally spaced above the annular member 16 so as to define an open switch condition therewith in response to the wind velocity sensed by the wind deflector 26 being below the preset magnitude. The wind vane 24 of the wind-sensing member 12 is capable of making electrical contact with the annular member 16 to define a closed switch condition therewith in response to the wind velocity sensed by the wind deflector 26 increasing above the preset magnitude. The height of the gap 52 between the wind vane 24 and annular member 16 at any given time will depend upon the particular magnitude of the velocity of the wind currently blowing.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A wind detecting and alerting apparatus, comprising:
   (a) an electrically-conductive wind-sensing member having first means for sensing wind direction and second means for sensing wind velocity;
   (b) an electrically-conductive support member electrically connected to and mounting said wind-sensing member for concurrently undergoing rotational movement about a first axis in response to sensing wind direction by said first means and pivotal movement about a second axis in response to sensing wind velocity by said second means, said second means being capable of causing increasing pivotal movement of said wind-sensing member about said second axis as wind velocity sensed by said second means increases in magnitude;
   (c) an electrically-conductive annular member;
   (d) means for mounting said angular member in a stationary position relative to said wind-sensing member and concentrically about said first axis and in alignment with a rotational path of said first means of said wind-sensing member about said first axis, said stationary annular member and wind-sensing member which is movable relative thereto together defining an electrical switch, said wind-sensing member being normally spaced from said stationary annular member to define an open switch condition therewith in response to wind velocity sensed by said second means being below a preset magnitude, said wind-sensing member being capable of movement toward said stationary annular member and of making electrical contact with said annular member to define a closed switch condition therewith in response to wind velocity sensed by said second means increasing above the preset magnitude; and
   (e) means electrically connected between said support member and annular member and being electrically connectable to a source of electrical power for producing an alarm in response to said electrical contact being made between said wind-sensing member and annular member to thereby provide an indication that wind velocity has increased above the preset magnitude.

2. The apparatus of claim 1 wherein said wind-sensing member includes an arm, a wind vane no said arm capable of sensing wind direction, and a wind deflector on said elongated arm capable of sensing wind velocity.

3. The apparatus of claim 2 wherein said wind deflector includes a main portion and a deflecting portion pivotally mounted in an inclined relation to said main portion, said deflecting portion being adjustable to change said inclined relation of said deflecting portion relative to said main portion and thereby to preset the velocity of the wind that is capable of pivoting said wind-sensing member into electrical contact with said annular member.

4. The apparatus of claim 2 wherein said wind vane is attached on an end of said arm and said wind deflector is attached on an upper portion of said wind vane.

5. The apparatus of claim 4 wherein said wind deflector includes a main portion attached on said wind vane and a deflecting portion pivotally mounted in an inclined relation to said main portion, said deflecting portion being adjustable to change said inclined relation of said deflecting position relative to said main portion and thereby to preset the velocity of the wind that is capable of pivoting said wind-sensing member into electrical contact with said annular member.

6. The apparatus of claim 4 wherein said main portion of said wind deflector has a pair of side flanges and said deflecting portion of said wind deflector has a pair of side tabs, said deflecting portion being pivotally supported at said side tabs between said side flanges of said main mounting portion.

7. The apparatus of claim 1 wherein said means for mounting said annular member in a stationary position relative to said wind-sensing member includes a support platform mounting said support member in an upright orientation on said platform, said platform also mounting said annular member concentrically about and spaced outwardly from said upright support member and below a rotational path defined by said wind-sensing member.

8. The apparatus of claim 7 wherein said upright support member includes:
   a lower shaft rotatably mounted to said platform; and
   an upper resiliently flexible elongated spring mounted to said lower shaft and mounting said wind-sensing member for pivotal movement relative to said platform and annular member.

9. The apparatus of claim 7 wherein said platform includes:
   an electrically non-conductive base; and
   a plurality of support posts attached in an upstanding relation on said base and spaced from one another about a periphery thereof, at least one of said support posts being electrically-conductive, said annular member being attached to upper ends of said support posts.

10. The apparatus of claim 9 wherein said upright support member includes:
    a lower shaft rotatably mounted to said base of said platform at a central location thereon; and
    an upper resiliently flexible elongated spring at a lower end being axially-adjustably mounted to an upper end of said lower shaft and at an upper end being attached to said wind-sensing member such that said rotatably-mounted lower shaft and said resiliently-flexible upper spring cooperate together to permit said wind-sensing member to undergo concurrently rotational movement about a generally vertical axis defined by said lower shaft in response to the sensing of wind direction and pivotal movement about a generally horizontal axis defined by said upper spring in response to the sensing of wind velocity.

11. The apparatus of claim 10 wherein said upper flexible spring at said lower end thereof frictionally fits in overlapping relation over said upper end of said lower shaft such that by adjustably moving said upper spring relative to said lower shaft a gap between said annular member and said wind-sensing member can be selectively increased or decreased in height in order to preset the magnitude of wind velocity required to deflect said wind-sensing member into contact with said annular member.

12. The apparatus of claim 1 wherein said alarm-producing means includes a power supply, an audible alarm, and a visible alarm being electrically connected together in series with said electrical switch defined by said wind-sensing member and said annular member, said audible alarm and visible alarm being capable of producing alarm signals in response to electrical contact being made between said wind-sensing member and annular member and thereby provide an indication that wind velocity has increased above the preset magnitude.

13. A wind detecting and alerting apparatus, comprising:
(a) an electrically-conductive wind-sensing member having an arm, a wind vane capable of sensing wind direction being attached on an end of said arm, and a wind deflector capable of sensing wind velocity being attached on an upper portion of said wind vane;
(b) an electrically-conductive support member electrically connected to and mounting said wind-sensing member for concurrently undergoing rotational movement about a first axis in response to sensing wind direction by said first means and pivotal movement about a second axis in response to sensing wind velocity by said second means, said second means being capable of causing increasing pivotal movement of said wind-sensing member about said second axis as wind velocity sensed by said second means increases in magnitude;
(c) an electrically-conductive annular member;
(d) a support platform mounting said support member in upright on said platform, said platform also mounting said annular member in a stationary position relative to said wind-sensing member and said support member and concentrically about and spaced outwardly from said support member and said first axis defined by said support member and below and in alignment with a rotational path of said first means of said wind-sensing member about said first axis, said stationary annular member and wind-sensing member which is movable relative thereto together defining an electrical switch, said wind-sensing member being normally spaced from said stationary annular member to define an open switch condition therewith in response to wind velocity sensed by said second means being below a preset magnitude, said wind-sensing member being capable of movement toward said stationary annular member and of making electrical contact with said annular member to define a closed switch condition therewith in response to wind velocity sensed by said second means increasing above the preset magnitude; and
(e) means electrically connected between said support member and annular member and being electrically connectable to a source of electrical power for producing an alarm in response to said electrical contact being made between said wind-sensing member and annular member to thereby provide an indication that wind velocity has increased above the preset magnitude.

14. The apparatus of claim 13 wherein said wind deflector includes a main portion attached on said wind vane and a deflecting portion pivotally mounted in an inclined relation to said main portion, said deflecting position being adjustable to change said inclined relation of said deflecting position relative to said main portion and thereby to preset the velocity of the wind that is capable of pivoting said wind-sensing member into electrical contact with said annular member.

15. The apparatus of claim 13 wherein said upright support member includes:
a lower shaft rotatably mounted to said platform; and
an upper resiliently flexible elongated spring mounted to said lower shaft and mounting said wind-sensing member for pivotal movement relative to said platform and annular member.

16. The apparatus of claim 15 wherein said platform includes:
an electrically non-conductive base; and
a plurality of support posts attached in an upstanding relation on said base and spaced from one another about a periphery thereof, at least one of said support posts being electrically-conductive, said annular member being attached to upper ends of said support posts.

17. The apparatus of claim 16 wherein said upright support member includes:
a lower shaft rotatably mounted to said base of said platform at a central location thereon; and
an upper resiliently flexible elongated spring at a lower end being axially-adjustably mounted to an upper end of said lower shaft and at an upper end being attached to said wind-sensing member such that said rotatably-mounted lower shaft and said resiliently-flexible upper spring cooperate together to permit said wind-sensing member to undergo concurrently rotational movement about a generally vertical axis defined by said lower shaft in response to the sensing of wind direction and pivotal movement about a generally horizontal axis defined by said upper spring in response to the sensing of wind velocity.

18. The apparatus of claim 17 wherein said upper flexible spring at said lower end thereof frictionally fits in overlapping relation over said upper end of said lower shaft such that by adjustably moving said upper spring relative to said lower shaft a gap between said annular member and said wind-sensing member can be selectively increased or decreased in height in order to preset the magnitude of wind velocity required to deflect said wind-sensing member into contact with said annular member.

19. A wind detecting and alerting apparatus, comprising:
(a) an electrically-conductive wind-sensing member having first means for sensing wind direction and second means for sensing wind velocity;
(b) an electrically-conductive support member electrically connected to and mounting said wind-sensing member for concurrently undergoing rotational movement about a first axis in response to sensing wind direction by said first means and pivotal movement about a second axis in response to sensing wind velocity by said second means, said second means being capable of causing increasing pivotal movement of said wind-sensing member about said second axis as wind velocity sensed by said second means increases in magnitude;

(c) an electrically-conductive annular member mounted concentrically about said first axis and in alignment with a rotational path of said first means of said wind-sensing member about said first axis, said annular member and wind-sensing member together defining an electrical switch, said wind-sensing member being normally spaced from said annular member to define an open switch condition therewith in response to wind velocity sensed by said second means being below a preset magnitude, said wind-sensing member being capable of making electrical contact with said annular member to define a closed switch condition therewith in response to wind velocity sensed by said second means increasing above the preset magnitude;

(d) means electrically connected between said support member and annular member and being electrically connectable to a source of electrical power for producing an alarm in response to said electrical contact being made between said wind-sensing member and annular member to thereby provide an indication that wind velocity has increased above the preset magnitude; and (e) a support platform mounting said support member in an upright orientation on said platform, said platform also mounting said annular member concentrically about and spaced outwardly from said upright support member and below a rotational path defined by said wind-sensing member, said platform including an electrically non-conductive base and a plurality of support posts attached in an upstanding relation on said base and spaced from one another about a periphery thereof, at least one of said support posts being electrically-conductive, said annular member being attached to upper ends of said support basis.

20. The apparatus of claim 19 wherein said upright support member includes:
 a lower shaft rotatably mounted to said base of said platform at a central location thereon; and
 an upper resiliently flexible elongated spring at a lower end being axially-adjustably mounted to an upper end of said lower shaft and at an upper end being attached to said wind-sensing member such that said rotatably-mounted lower shaft and said resiliently-flexible upper spring cooperate together to permit said wind-sensing member to undergo concurrently rotational movement about a generally vertical axis defined by said lower shaft in response to the sensing of wind direction and pivotal movement about a generally horizontal axis defined by said upper spring in response to the sensing of wind velocity.

21. The apparatus of claim 20 wherein said upper flexible spring at said lower end thereof frictionally fits in overlapping relation over said upper end of said lower shaft such that by adjustably moving said upper spring relative to said lower shaft a gap between said annular member and said wind-sensing member can be selectively increased or decreased in height in order to preset the magnitude of wind velocity required to deflect said wind-sensing member into contact with said annular member.

* * * * *